(12) United States Patent
Takemura

(10) Patent No.: US 6,188,883 B1
(45) Date of Patent: *Feb. 13, 2001

(54) CELLULAR TYPE MOBILE COMMUNICATION SYSTEM THAT PROVIDES COMMUNICATION RESTRICTION COMMAND CODES ALONG WITH BASE STATION ID CODES FOR BASE STATIONS WHERE MOBILE COMMUNICATIONS IS RESTRICTED

(75) Inventor: Narihira Takemura, Kanagawa (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/928,341

(22) Filed: Sep. 12, 1997

(30) Foreign Application Priority Data

Sep. 13, 1996 (JP) .................................. 8-243025

(51) Int. Cl.⁷ ............................................... H04Q 7/38
(52) U.S. Cl. .......................... 455/411; 455/63; 455/422; 455/522
(58) Field of Search .............................. 455/411, 66, 62, 455/432, 435, 517, 522, 422, 63

(56) References Cited

U.S. PATENT DOCUMENTS

| 4,811,421 | * | 3/1989 | Havel et al. | 455/522 |
| 5,241,690 | * | 8/1993 | Larsson et al. | 455/522 |
| 5,267,262 | * | 11/1993 | Wheatley, III | 455/522 |
| 5,442,805 | * | 8/1995 | Sagers et al. | 455/33.1 |
| 5,465,392 | * | 11/1995 | Baptist et al. | 455/522 |
| 5,517,554 | * | 5/1996 | Mitchell et al. | 455/411 |
| 5,594,946 | * | 1/1997 | Menich et al. | 455/522 |
| 5,722,051 | * | 2/1998 | Agrawal et al. | 455/522 |
| 5,790,955 | * | 8/1998 | Tomoike | 455/432 |

FOREIGN PATENT DOCUMENTS 10-42362  2/1998  (JP) .

OTHER PUBLICATIONS

K. Weiss et al., "Conventional Local Area Radio Coverage System" (Motorola Technical Developments, vol. 13, Jul., 1991, pp. 67–69.

* cited by examiner

Primary Examiner—Daniel S. Hunter
Assistant Examiner—Thuan T. Nguyen
(74) Attorney, Agent, or Firm—Foley & Lardner

(57) ABSTRACT

A communication restriction command code for a mobile station is added to a base station identification code transmitted from the base station. When the mobile station is positioned within an area desired to suppress electromagnetic wave signals, the base station identification code including the communication restriction command code is received to interrupt transmission or reduce transmission power to be smaller than normal transmission power to perform communication control for restricting transmission of the mobile station.

7 Claims, 4 Drawing Sheets

CELLULAR TYPE MOBILE COMMUNICATION SYSTEM THAT PROVIDES COMMUNICATION RESTRICTION COMMAND CODES ALONG WITH BASE STATION ID CODES FOR BASE STATIONS WHERE MOBILE COMMUNICATIONS IS RESTRICTED

BACKGROUND OF THE INVENTION

1. Field of the Invention

The present invention relates generally to a Cellular type mobile communication system. More specifically, the present invention relates to a communication control method in a base station and a mobile station of Cellular type mobile communication system suitable for an area desired to suppress electromagnetic wave signals, such as an area of a medical institution using medical electronic equipment.

2. Description of the Related Art

Conventionally, in the Cellular type mobile communication system of the type, to which the present invention concerns, areas, in which suppression of electromagnetic wave noise is desired, are preliminarily notified to users of mobile stations, such as portable telephone or cellular phone, by document or the like, and use of the mobile station is restricted in such area. Thus, conventionally, restricting transmission in the area desired to restrict electromagnetic wave noise is done relying on own judgment of the user of the mobile station.

However, in the system controlling communication relying on own judgment of the user of the mobile station, restriction effect cannot be satisfactorily achieved in the area where suppression of electromagnetic wave noise is desired, including medical institution using medical electronic equipment easily influenced by the electromagnetic wave noise.

SUMMARY OF THE INVENTION

It is therefore an object of the present invention to provide a Cellular type mobile communication system which can affirmatively control use of a mobile station in an area where suppression of electromagnetic wave noise is desired.

The present invention is directed to a Cellular type mobile communication system. According to the present invention, a communication restriction command code for restricting a communication of a mobile station is added to a base station identification code transmitted from a base station covering an area where suppression of an electromagnetic wave noise is desired. Transmission of the mobile station is restricted by receiving the communication restriction command code added to the base station identification code when the mobile station is located within the area desired to suppress electromagnetic wave noise.

In this case, the communication restriction command code may be an identification code indicative whether the mobile station is enabled or disabled transmission.

On the other hand, transmission of the mobile station is controlled so that the mobile station receiving the base station identification code including the communication restriction command code interrupts transmission, or, makes transmission power to be smaller than that of normal transmission power.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscuring the present invention.

Figure 1:
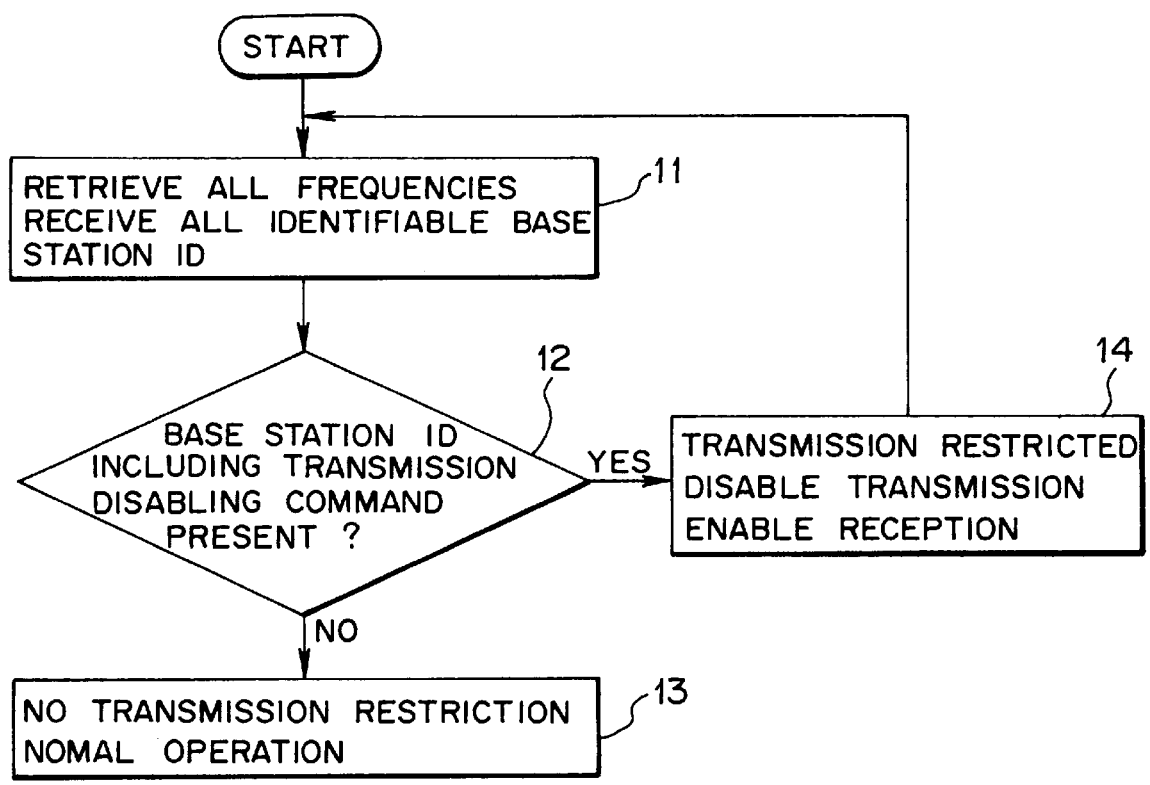
FIG. 1 is a flowchart for explaining operation on a mobile station side when transmission of a mobile station is interrupted by a communication restriction command code with an identification code of the base station.

FIG. 1 is a flowchart for explaining operation of communication control in the case that transmission on a mobile station side is interrupted within an area where suppression of electromagnetic wave noise is desired, in a Cellular type mobile communication system including a base station L covering an area desired to suppress electromagnetic wave noise.

Figure 2:
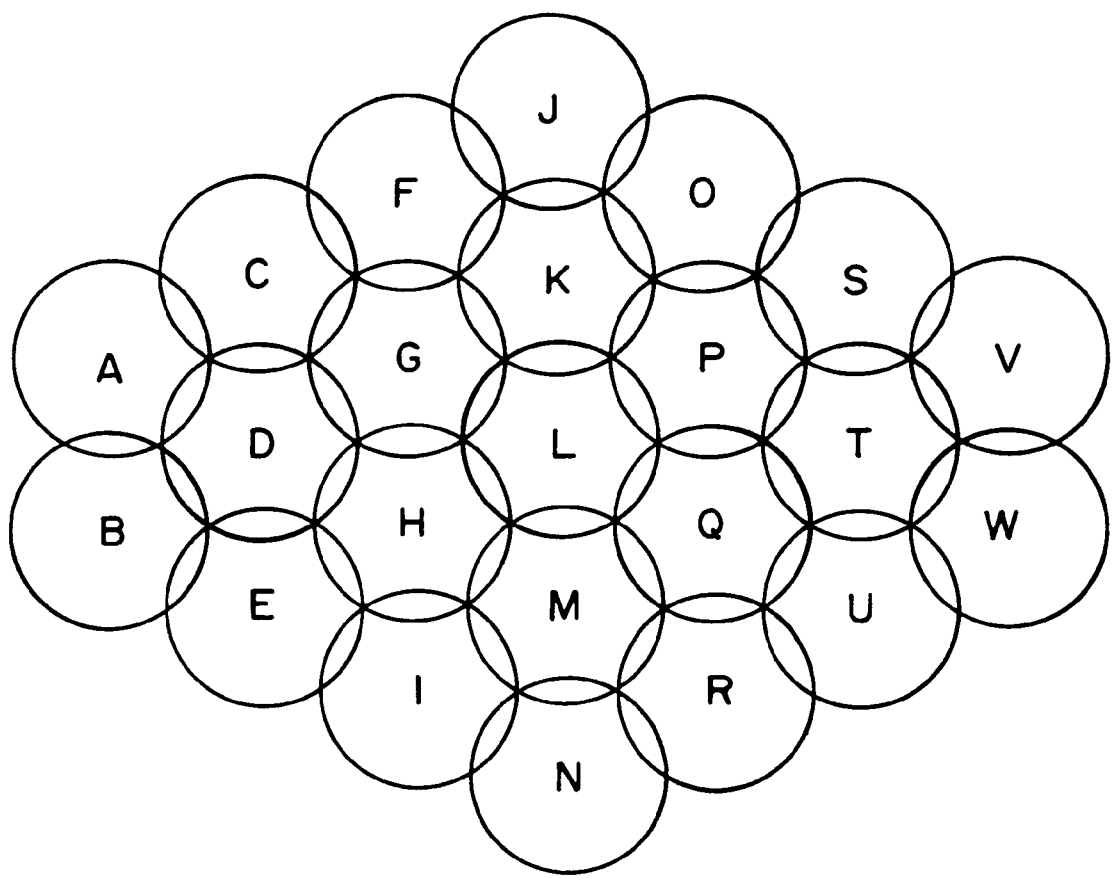
FIG. 2 is an illustration showing cell regions covered by respective base stations of the Cellular type mobile communication system.

FIG. 2 shows cell regions covered by respective base station in a Cellular system, including the base station L covering the area desired to suppress electromagnetic wave noise. Respective alphabetic characters A to W represent respective base stations (base station A, base station B, base station C, base station D, base station E, base station F, base station G, base station H, base station I, base station J, base station K, base station L, base station M, base station N, base station O, base station P, base station Q, base station R, base station S, base station T, base station U, base station V and base station W), and circles surrounding respective alphabetic characters show support area (cell regions) of respective base stations. Discussion will be given hereinafter with respect to the case where the cell region covered by the base station L shown in FIG. 2 is an electromagnetic wave noise restricting area.

At first, in order to give a notice to the mobile stations located in the cell region of the base station L that the cell region is a region where transmission should be interrupted, a transmission disabling command code is added to the base station identification code of the base station L, and other base stations (base stations A, B, C, D, E, F, G, H, I, J, K, L, M, N, O, P, Q, R, S, T, U, V, W) are given only normal base station identification code or by adding control command code enabling transmission and reception. Hereinafter, the base station identification code including the transmission control command code will be referred to as base station ID.

As shown in FIG. 1, the mobile station retrieves all frequencies (carriers) before initiation of transmission and receives all base station IDs which can be identified (step 11).

Then, check is performed whether any base station ID including the transmission disabling command code is included in the received base station IDs (step 12).

If no base station ID including the transmission disabling command code is present as a result of checking, judgment is made that the current position of the mobile station has no restriction of transmission. Then, the mobile station is enabled transmission and thus placed for normal mode operation (step 13).

On the other hand, as a result of checking at step 12, if at least one base station ID including the transmission disabling command code is present, judgment is made that the current position of the mobile station has restriction of transmission. Then, the mobile station is disabled transmission to perform only receiving operation (step 14). If the mobile station is operated for transmission in this condition, the foregoing process is repeated with returning to step 11 to make judgment again for enabling and disabling transmission. Since disabling of transmission is maintained until the mobile station moves out of the area having restriction of transmission, transmission may not be enabled despite of operation for transmission as long as the mobile station is remained within the area having restriction of transmission.

It should be noted that the transmission control flow as shown in FIG. 1 is executed every time before the mobile station selects the destined base station and initiates transmission or before initiation of transmission upon hand over for selection of the base station to be switched by the mobile station.

Figure 3:
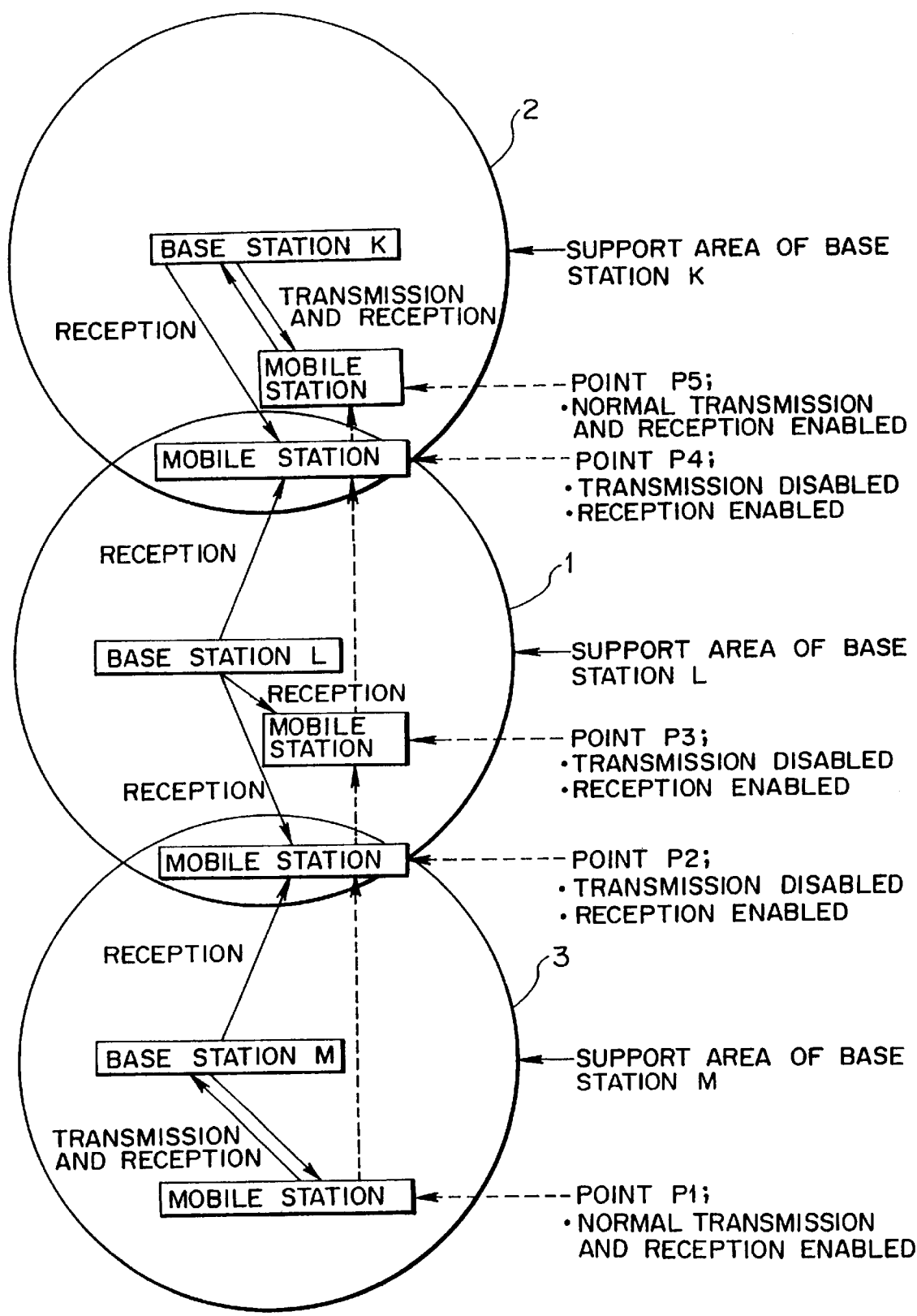
FIG. 3 is an explanatory illustration of the case where the mobile station moves between different cell regions.

FIG. 3 shows a particular manner of transmission control in the case where the mobile station moves from the area covered by the base station M to the area covered by the base station K across the area covered by the base station L. Hereinafter, transmission control operations at respective points will be discussed. Here, it is assumed that the transmission disabling command code is added for the base station ID of the base station L, and the circles surrounding respective base stations represent support areas (cell regions) of respective base station, and thus defines the range where the mobile station may identify the base station ID.

The mobile station located at a point P1 is not covered by the areas of the base station L. Therefore, the base station IDs which can be received at the point P1 do no include the base station ID of the base station L. Thus, by establishing a radio link with the base station M, normal transmission and reception is enabled.

When the mobile station is moved from the point P1 to the point P2, since the received field intensity from the base station M is weakened, the based station to be switched is designated by the currently communicating base station to initiate hand-over or the mobile station selects the base station to be switched to initiate hand-over.

In the shown embodiment, discussion will be given for the case where the mobile station selects the base station to be switched and initiates hand-over.

At a timing where the mobile station starts retrieval of the base stations (according to the flowchart of FIG. 1) for hand-over, the mobile station receives respective base station IDs including that of the base station L. The mobile station is controlled to disable transmission and enable only reception, in response to the base station ID having the transmission disabling command code from the base station L. At this time, it is desirable that the mobile station performs display for notifying that it is placed within the area having restriction of transmission and thus transmission is disabled.

On the other hand, at the occurrence of hand-over according to designation by the base station, the restriction of transmission and so forth is managed by the network. Therefore, the base station having restriction of transmission (disabling of transmission in the shown embodiment) will never be designated as the base station to be switched. If switching of the base station is performed according to designation, the mobile station is not required to execute the transmission control flow of FIG. 1, again.

It should be noted that while the mobile station moves from the point P2 to a point P4 across a point P3, the base station ID (including the transmission disabling command code) of the base station L can be received. Therefore, according to the transmission control flow of FIG. 1, disabling of transmission is maintained to perform only receiving operation.

Then, when the mobile station reaches the station P5, the mobile station is placed out of the reception area of the base station ID including the transmission disabling command code. Thus, normal transmission and reception is enabled. Namely, at the point P5, a radio link with the base station K is established.

On the other hand, the mobile station on communication enters into the cell region of the base station having the base station ID including the transmission disabling command code. When the transmission disabling command code is received, interruption of communication becomes necessary. At this time, the fact that the mobile station enters into the transmission disabling area, is displayed on a liquid crystal display (LCD) or so forth for notifying to the user. In the alternative, audible sound is generated through a speaker to break communication.

It should be noted that the mobile station located within the cell region of the base station having the base station ID including the transmission disabling command code cannot perform response (transmission) even upon arrival of the call. Therefore, the fact that the mobile station is in the transmission disabling area and thus the call cannot be responded, is displaced on the liquid crystal display (LCD) or so forth on the mobile station side, or an audible sound notifying the fact is generated through the speaker or so forth.

Next, discussion will be given for the case where the mobile station is controlled to disable transmission within the cell region of the base station L of FIG. 2, to restrict transmission outputs of the mobile station within the cell regions of the base station H, the base station K, the base station M, the base station P and the base station Q is restricted up to a given output.

At first, in order to notify to the mobile station located within the cell region of the base station L that the cell region is to disable transmission, the transmission disabling command code is added to the base station ID of the base station L. Next, in order to notify that the cell regions are required to restrict the transmission output down to the given output level, the mobile stations located within the cell regions adjacent to the cell region L, those being the cell regions of the base station G, the base station H, the base station K, the base station M, the base station P and the base station Q, transmission output restriction command code is added to the base station IDs of the base stations (G, H, K, M, P and Q).

On the other hand, a transmission output restriction value is included in the transmission output restriction command code in a form identified by the mobile stations. In the alternative, the fixed transmission output restriction value is standardized per communication system.

It should be noted that for other base stations (base stations A, B, C, D, E, F, I, J, N, O, R, S, T, U, V and W), normal base station ID or base station ID including the transmission enabling control command code may be set.

Figure 4:
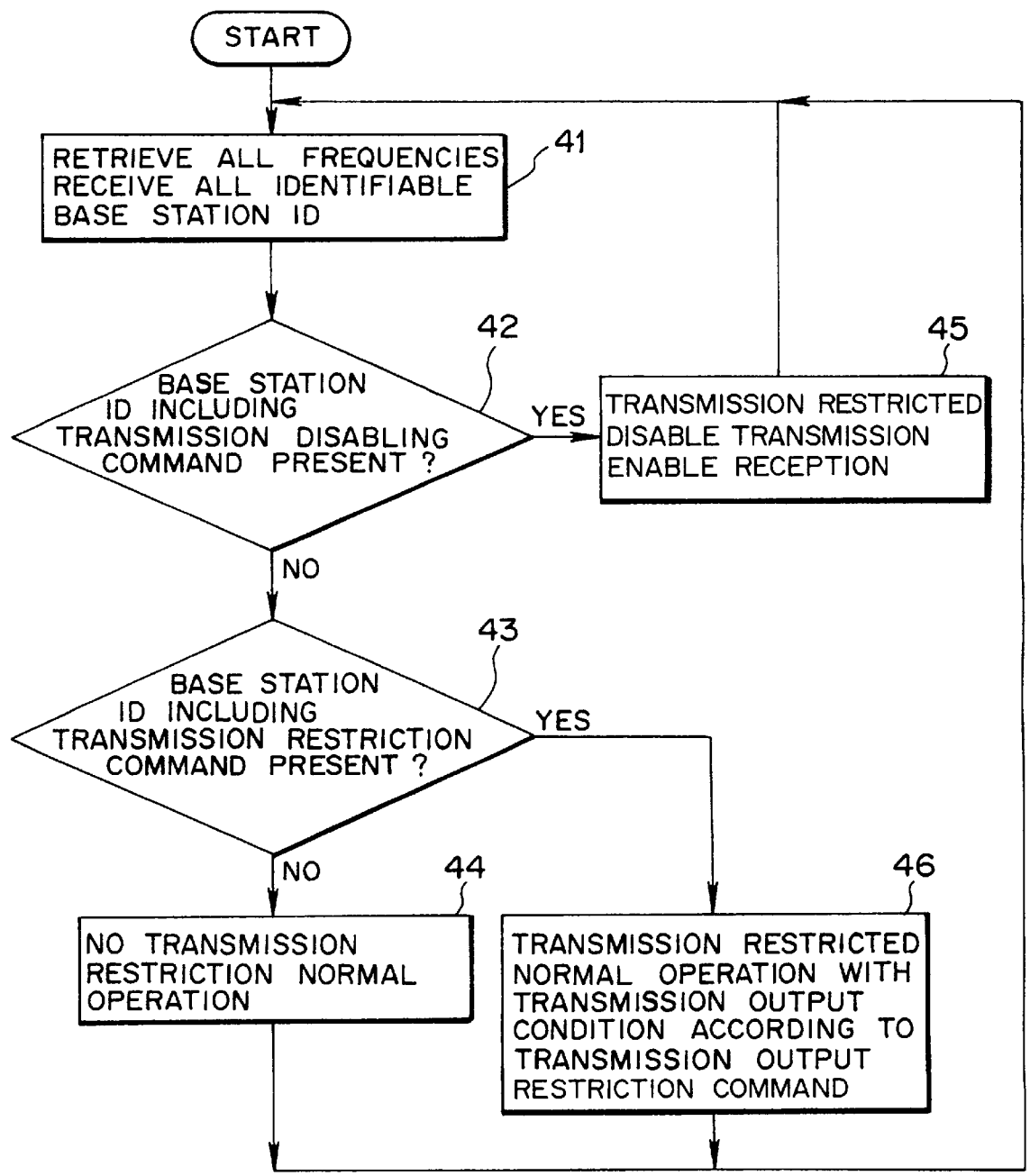
FIG. 4 is a flowchart for explaining operation of the mobile station side in the case where a communication power of the mobile station is made smaller than normal transmission power in response to the communication restriction command code with the identification code of the base station.

Concerning transmission, the mobile station operates according to the transmission control flow shown in FIG. 4. The detail of the operation will be discussed hereinafter.

As shown in FIG. 1, the mobile station retrieves all frequencies (carriers) before initiation of transmission and receives all base station IDs which can be identified (step 41).

Then, check is performed whether any base station ID including the transmission disabling command code is included in the received base station IDs (step 42).

As a result of checking at step 42, if at least one base station ID including the transmission disabling command code is present, judgment is made that the current position of the mobile station has restriction of transmission. Then, the mobile station is disabled transmission to perform only receiving operation (step 45). If the mobile station is operated for transmission in this condition, the foregoing process is repeated with returning to step 41 to make judgment again for enabling and disabling transmission. Since disabling of transmission is maintained until the mobile station moves out of the area having restriction of transmission, transmission may not be enabled despite of operation for transmission as long as the mobile station is remained within the area having restriction of transmission.

If no base station ID including the transmission disabling command code is present as a result of checking at step 42, judgment is made that the current position of the mobile station has no restriction of transmission. Then, process is proceeded to the next step (step 43). Then, check is performed whether the base station ID having the transmission output restricting command is present in the received base station IDs (step 43).

If no base station having the transmission output control command is presented as a result of checking (step 43), judgment is made that the cell region where the mobile station is currently positioned, has no restriction of transmission. Then, the mobile station is enabled transmission to perform normal operation (step 44).

On the other hand, as a result of checking process (step 43), if at least one base station ID having transmission output restriction command code is present, judgement is made that the cell region where the mobile station is currently located has restriction of transmission. Then, normal operation is enabled under a condition where transmission is performed according to a control command having the lowest transmission output among the transmission output restriction command codes which can be identified (step 46).

It should be noted that the transmission control flow as shown in FIG. 4 is executed every time before the mobile station selects a base station and initiates transmission or before initiation of transmission upon hand over for selection of the base station to be switched by the mobile station.

Next, as an example of the case where the command code, such as the transmission disabling command code, transmission output restriction command code and so forth, is included in the base station ID, and assuming that the base station ID includes 10 bits, discussion will be given for the cases where some bits are not currently used as the base station ID and where all bits are used as the base station ID.

At first, if some bits among 10 bits that make up the base station ID are not used, respective command can be realized by using a part or all of bits.

For example, when the upper four bits are not used as the base station ID, and each command is expressed by two bits, it may be possible to assign in such a manner that when the base station ID starts from 10th bit as counted from the most significant bit, the command is a transmission disabling command, and when the base station ID starts from 11th bit as counted from the most significant bit, the command is a transmission power restricting command.

On the other hand, when all bits of the base station ID that make up 10 bits are already used, number of bits expressing the base station ID is extended in number of bits greater than or equal to the minimum bit number required for expressing respective command code. Thus, a respective command code can be included in the base station ID.

It should be noted that, in any of the foregoing cases, the mobile station stores the manner of assignment of respective command code to the base station ID so that judgment can be made whether the command code is included in the base station ID upon reception of the base station ID to perform operation as required by the command code.

As set forth above, by adding the communication restriction command code to the base station identification code, the mobile station receiving the base station identification code can make judgment whether the current area where the mobile station is located, is the area desired to suppress electromagnetic wave noise or not. Thus, restriction of transmission of the mobile station in the area desired restriction of the electromagnetic valve noise can be satisfactorily performed.

Although the present invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A Cellular mobile communication system in which by adding a communication restriction command code for restricting transmission of a mobile station to a base station identification code transmitted from a first base station covering an area where suppression of an electromagnetic wave signal is desired, transmission of said mobile station is restricted by receiving said communication restriction command code added to said base station identification code when said mobile station is located within the area desired to suppress the electromagnetic wave signal, wherein transmission of said mobile station is restricted in the area covered by the first base station based solely on non-cellular equipment being located in the area covered by the first base station in which it is desired to suppress the electromagnetic wave signal of said mobile station, and wherein, when said mobile station is located in a region that includes the area covered by the first base station and a second area that is covered by a second base station in which transmission restriction is not to be performed, said mobile station receives a first ID code from the first base station and the communication restriction command code from the first base station, as well as a second ID code from the second base station, and wherein said mobile station is still restricted from transmitting when the mobile station receives the communication restriction command code from the first base station but not from the second base station.

2. A method for restricting transmissions in a Cellular mobile communication system, comprising:

a) receiving, by a mobile station, identifiers from all base stations within a reception range of the mobile station, each base station having a corresponding coverage cell;

b) determining, by the mobile station, if any of the received identifiers also include a transmission restriction command; and c) if the determination made in step b) is that at least one transmission restriction command has been received by the mobile station, performing restriction of mobile communications by the mobile station, wherein the restriction is performed in step c) irrespective as to whether or not a corresponding identifier from another base station in which transmission restriction is not required has been received in step a).

3. The method as set forth in claim 2, wherein the restriction in step c) corresponds to allowance of transmissions by the mobile station only below a single preset transmission level.

4. The method as set forth in claim 1, wherein the single preset transmission level is set based on information included in the at least one transmission restriction command received by the mobile station.

5. The method as set forth in claim 2, wherein the determination made in step b) is performed every time the mobile station initiates transmission or upon hand over for selection of a particular base station to be switched to, and wherein the mobile station performs the selection during the hand over.

6. The method as set forth in claim 2, wherein step a) is performed by the mobile station during initialization of transmission over the Cellular mobile communication system, the method further comprising:

d) during a handover in which the mobile station moves from a first area controlled by a first base station to a second area controlled by a second base station in which communications restriction is required, the mobile station is only allowed to receive communications in the second area, when previously the mobile station was allowed to both transmit and receive communications in the first area.

7. The method as set forth in claim 6 wherein, when the mobile station moves from the second area to a third area controlled by a third base station in which communications restriction is not required, the mobile station is allowed to both transmit and receive communications in the third area.

* * * * *